(12) United States Patent
Gan et al.

(10) Patent No.: US 6,727,022 B2
(45) Date of Patent: Apr. 27, 2004

(54) POWDER PROCESS FOR DOUBLE CURRENT COLLECTOR SCREEN CATHODE PREPARATION

(75) Inventors: Hong Gan, East Amherst, NY (US); Esther S. Takeuchi, East Amherst, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 253 days.

(21) Appl. No.: 09/992,227

(22) Filed: Nov. 19, 2001

(65) Prior Publication Data

US 2003/0096169 A1 May 22, 2003

(51) Int. Cl.$^7$ .................................................. H01M 4/74
(52) U.S. Cl. ..................... 429/241; 429/245; 429/128; 429/219; 429/220; 429/224; 429/231.1; 429/231.5; 429/231.7; 429/231.95; 429/329; 429/330; 429/332; 429/322
(58) Field of Search ................................ 429/241, 245, 429/128, 219, 220, 224, 231.1, 231.5, 231.7, 231.95, 329, 330, 332, 322

(56) References Cited

U.S. PATENT DOCUMENTS

| | | | |
|---|---|---|---|
| 5,435,874 A | | 7/1995 | Takeuchi et al. |
| 5,543,249 A | | 8/1996 | Takeuchi et al. |
| 5,545,497 A | | 8/1996 | Takeuchi et al. |
| 5,571,640 A | | 11/1996 | Takeuchi et al. |
| 5,614,331 A | | 3/1997 | Takeuchi et al. |
| 5,744,258 A | * | 4/1998 | Bai et al. ........................ 429/3 |
| 5,981,105 A | | 11/1999 | Smith et al. |
| 6,551,747 B1 | * | 4/2003 | Gan ........................... 429/245 |
| 2002/0090551 A1 | * | 7/2002 | Gan et al. ................. 429/218.1 |
| 2002/0098411 A1 | * | 7/2002 | Gan et al. .................... 429/128 |

* cited by examiner

Primary Examiner—Laura Weiner
(74) Attorney, Agent, or Firm—Michael F. Scalise

(57) ABSTRACT

The present comprises an electrode having the configuration: first active material/current collector screen/second active material. When one of the active materials is in a powder form, it is possible for that material to move through openings in the current collector screen to "contaminate" the interface between the other active material and the current collector. The present invention consists of having the other electrode active materials in a form incapable of moving through the current collector to the other side thereof. Then, the assembly is pressed from the direction of the other electrode active material. This seals off the current collector as the pressing force moves the current collector against the powdered electrode active material.

24 Claims, No Drawings

POWDER PROCESS FOR DOUBLE CURRENT COLLECTOR SCREEN CATHODE PREPARATION

BACKGROUND OF THE INVENTION

1. Field of Invention

This invention relates to the conversion of chemical energy to electrical energy. In particular, the current invention relates to a new sandwich electrode design and a process for manufacturing the same. Sandwich electrodes are useful as the cathode in primary lithium cells and as the positive electrode in secondary lithium ion cells. These designs make such cells particularly useful for powering implantable medical devices.

2. Prior Art

Early medical devices in many cases used at least two lithium electrochemical cells in series as their power source. However, the electronic circuits in these devices now consume less energy than before. This makes it currently possible to use a single lithium cell as a reliable power source. With a unitary cell design, the requirement for high power density in many applications is even greater as the result of lowered pulsing voltage. Thus, a large electrode surface area is needed to accomplish this requirement. However, as the electrode surface area increases, more inert materials (current collector, separator, etc.) are introduced into the system. As a result, the cell's volumetric capacity is decreased. Another concern is medical device longevity, which is dependent on the cell's capacity and power efficiency.

An attempt to use high capacity materials, such as $CF_x$, by mixing it with a high rate cathode material, such as SVO, is reported in U.S. Pat. No. 5,180,642 to Weiss et. al. However, electrochemical cells made with these cathode composites have relatively lower rate capability. The benefit of increasing the cell theoretical capacity by using $CF_x$ as part of the cathode mix is balanced, in part, by lowering its power capability in a high rate discharge application, such as is encountered in an implantable cardiac defibrillator.

A significant solution to this problem is described in U.S. Pat. NO. 6,551,747 to Gan entitled Sandwich Cathode Design For Alkali Metal Electrochemical Cell With High Rate Capability by Gan et al., which is assigned to the assignee of the current invention and is incorporated herein by reference. This application describes a new sandwich electrode design using silver vanadium oxide (SVO) and a fluorinated carbon ($CF_x$). An exemplary sandwich electrode has the following configuration:

SVO/current collector screen/$CF_x$/current collector screen/SVO.

However, if one or both of the active materials is in a powdered form and the openings in the current collector screen are too large, there can be communication of one of them to the other side of the current collector during the manufacturing process. This "contamination" is undesirable as it detracts from discharge performance. Specifically, SVO is of a higher rate capability, but a lower energy density than $CF_x$. Therefore, contamination of the interface between the current collector and one of the active materials by the other is undesirable as it defeats the purpose of having the respective active materials segregated on opposite sides of the current collector in the first place.

SUMMARY OF THE INVENTION

To maintain the improved discharge capability of a cell containing a sandwich electrode, it is necessary to maintain direct contact of both the first and second electrode materials with the opposed sides of the current collector. A good contact or adhesion translates into good interfacial conductivity during discharge. Although it is clear in theory, in practice this interfacial conductivity is highly influenced by the manufacturing methods or processes. When the current collector is a screen, it is possible for some of one of the powdered electrode materials to pass through the current collector openings and become trapped between the other electrode material and the current collector. This leads to decreased interfacial conductivity between the current collector and the "contaminated" first electrode material.

Thus, the present process consists of having one of the electrode active materials in a cohesive form incapable of moving through the current collector to the other side thereof. The other or second active material is in a powdered form capable of communication through the current collector. Then, the assembly of first active material/current collector/second active material is pressed from the direction of the first, cohesive electrode active material, which causes it to seal off the current collector as the pressing force moves the current collector against the second, powdered electrode active material.

These and other objects of the present invention will become increasingly more apparent to those skilled in the art by reference to the following description.

DETAILED DESCRIPTION OF THE PREFERRED EMBODIMENTS

The electrochemical cell of the present invention is of either a primary chemistry or a secondary, rechargeable chemistry. For both the primary and secondary types, the cell comprises an anode active metal selected from Groups IA, IIA and IIIB of the Periodic Table of the Elements, including lithium, sodium, potassium, etc., and their alloys and intermetallic compounds including, for example, Li—Si, Li—Al, Li—B, Li—Mg and Li—Si—B alloys and intermetallic compounds. The preferred metal comprises lithium. An alternate negative electrode comprises a lithium alloy, such as lithium-aluminum alloy. The greater the amount of aluminum present by weight in the alloy, however, the lower the energy density of the cell.

For a primary cell, the anode is a thin metal sheet or foil of the lithium material, pressed or rolled on a metallic anode current collector, i.e., preferably comprising nickel, to form the negative electrode. In the exemplary cell of the present invention, the negative electrode has an extended tab or lead of the same material as the current collector, i.e., preferably nickel, integrally formed therewith such as by welding and contacted by a weld to a cell case of conductive material in a case-negative electrical configuration. Alternatively, the negative electrode may be formed in some other geometry, such as a bobbin shape, cylinder or pellet to allow an alternate low surface cell design.

In secondary electrochemical systems, the anode or negative electrode comprises an anode material capable of intercalating and de-intercalating the anode active material, such as the preferred alkali metal lithium. A carbonaceous negative electrode comprising any of the various forms of carbon (e.g., coke, graphite, acetylene black, carbon black, glassy carbon, etc.) which are capable of reversibly retaining the lithium species, is preferred for the anode material. A "hairy carbon" material is particularly preferred due to its relatively high lithium-retention capacity. "Hairy carbon" is a material described in U.S. Pat. No. 5,443,928 to Takeuchi et al., which is assigned to the assignee of the present invention and incorporated herein by reference. Graphite is another preferred material. Regardless of the form of the carbon, fibers of the carbonaceous material are particularly advantageous because they have excellent mechanical properties which permit them to be fabricated into rigid electrodes that are capable of withstanding degradation during repeated charge/discharge cycling. Moreover, the high surface area of carbon fibers allows for rapid charge/discharge rates.

A typical negative electrode for a secondary cell is fabricated by mixing about 90 to 97 weight percent "hairy carbon" or graphite with about 3 to 10 weight percent of a binder material, which is preferably a fluoro-resin powder such as polytetrafluoroethylene (PTFE), polyvinylidene fluoride (PVDF), polyethylenetetrafluoroethylene (ETFE), polyamides, polyimides, and mixtures thereof. This negative electrode admixture is provided on a current collector such as of a nickel, stainless steel, or copper foil or screen by casting, pressing, rolling or otherwise contacting the admixture thereto.

In either the primary cell or the secondary cell, the reaction at the positive electrode involves conversion of ions which migrate from the negative electrode to the positive electrode into atomic or molecular forms. For a primary cell, the cathode active material comprises a carbonaceous chemistry or at least a first transition metal chalcogenide constituent which may be a metal, a metal oxide, or a mixed metal oxide comprising at least a first and a second metals or their oxides and possibly a third metal or metal oxide, or a mixture of a first and a second metals or their metal oxides incorporated in the matrix of a host metal oxide. The cathode active material may also comprise a metal sulfide.

Carbonaceous active materials are preferably prepared from carbon and fluorine, which includes graphitic and nongraphitic forms of carbon, such as coke, charcoal or activated carbon. Fluorinated carbon is represented by the formula $(CF_x)_n$, wherein x varies between about 0.1 to 1.9 and preferably between about 0.5 and 1.2, and $(C_2F)_n$, wherein n refers to the number of monomer units which can vary widely.

One preferred mixed metal oxide is a transition metal oxide having the general formula $SM_xV_2O_y$ where SM is a metal selected from Groups IB to VIIB and VIII of the Periodic Table of Elements, wherein x is about 0.30 to 2.0 and y is about 4.5 to 6.0 in the general formula. By way of illustration, and in no way intended to be limiting, one exemplary cathode active material comprises silver vanadium oxide having the general formula $Ag_xV_2O_y$ in any one of its many phases, i.e., β-phase silver vanadium oxide having in the general formula x=0.35 and y=5.18, γ-phase silver vanadium oxide having in the general formula x=0.80 and y=5.40 and ε-phase silver vanadium oxide having in the general formula x=1.0 and y=5.5, and combination and mixtures of phases thereof. For a more detailed description of such cathode active materials reference is made to U.S. Pat. No. 4,310,609 to Liang et al., which is assigned to the assignee of the present invention and incorporated herein by reference.

Another preferred composite transition metal oxide cathode material includes $V_2O_z$ wherein $z \leq 5$ combined with $Ag_2O$ having silver in either the silver(II), silver(I) or silver(0) oxidation state and CuO with copper in either the copper(II), copper(I) or copper(0) oxidation state to provide the mixed metal oxide having the general formula $Cu_xAg_yV_2O_z$, (CSVO). Thus, the composite cathode active material may be described as a metal oxide-metal oxide-metal oxide, a metal-metal oxide—metal oxide, or a metal—metal-metal oxide and the range of material compositions found for $Cu_xAg_yV_2O_z$ is preferably about $0.01 \leq z \leq 6.5$. Typical forms of CSVO are $Cu_{0.16}Ag_{0.67}V_2O_z$ with z being about 5.5 and $CU_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material reference is made to U.S. Pat. Nos. 5,472,810 to Takeuchi et al. and 5,516,340 to Takeuchi et al., both of which are assigned to the assignee of the present invention and incorporated herein by reference.

In addition to the previously described fluorinated carbon, silver vanadium oxide and copper silver vanadium oxide, $Ag_2O$, $Ag_2O_2$, $CuF_2$, $Ag_2CrO_4$, $MnO_2$, $V_2O_5$, $MnO_2$, $TiS_2$, $Cu_2S$, FeS, $FeS_2$, copper oxide, copper vanadium oxide, and mixtures thereof are contemplated as useful active materials.

In secondary cells, the positive electrode preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

To charge such secondary cells, lithium ions comprising the positive electrode are intercalated into the carbonaceous negative electrode by applying an externally generated electrical potential to the cell. The applied recharging electrical potential serves to draw lithium ions from the cathode active material, through the electrolyte and into the carbonaceous material of the negative electrode to saturate the carbon. The resulting $Li_xC_6$ negative electrode can have an x ranging between 0.1 and 1.0. The cell is then provided with an electrical potential and is discharged in a normal manner.

The above described cathode active materials, whether of a primary or a secondary chemistry, are formed into a sandwich electrode body for incorporation into an electrochemical cell by mixing one or more of them with a binder material. Suitable binders are powdered fluoro-polymers, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 1 to 5 weight percent, a conductive diluent present at about 1 to 5 weight percent and about 90 to 98 weight percent of the cathode active material.

According to the present invention, two different ones of the above cathode active materials, whether of a primary or a secondary chemistry, are contacted to opposite sides of a current collector. Preferably, the first active material on the side of the current collector facing the anode is of a lesser energy density, but of a greater rate capability than the second active material on the opposite side of the current collector and spaced from the anode. In other words, the exemplary second cathode active material never directly faces the lithium anode.

A preferred first cathode active material having a greater rate capability, but a lesser energy density is of a mixed metal oxide such as SVO or CSVO. This material is typically provided in a formulation of, by weight, about 94% SVO and/or CSVO, 3% binder and 3% conductive diluent as the formulation facing the anode. The second active material in contact with the other side of the current collector is, for example, $CF_x$. This material is preferably provided in a second active formulation having, by weight, about 91% $CF_x$, 5% binder and 4% conductive diluent.

Suitable current collectors are selected from the group consisting of stainless steel, titanium, tantalum, platinum, gold, aluminum, cobalt nickel alloys, highly alloyed ferritic stainless steel containing molybdenum and chromium, and nickel-, chromium- and molybdenum-containing alloys. The preferred current collector material is titanium, and most preferably the titanium cathode current collector has a thin layer of graphite/carbon material, iridium, iridium oxide or platinum applied thereto. Cathodes prepared as described above may be in the form of one or more plates operatively associated with at least one or more plates of anode material, or in the form of a strip wound with a corresponding strip of anode material in a structure similar to a "jellyroll".

Therefore, one exemplary cathode plate has the active material formulations short circuited to each other by parallel connection through the current collectors with the following configuration:

SVO/current collector screen/$CF_x$/current collector screen/SVO.

Because it requires less processing steps, it is desirable to use many of the previously described cathode active formulations in a powder form. That is, a press fixture is loaded with a charge of the second cathode active material in a powder form followed by a current collector screen laid on top thereof. Then, the first cathode active material is positioned on top of the current collector, and the entire assembly is subjected to a pressure sufficient to intimately contact the active materials to the respective sides of the current collector.

When the current collector openings are of a greater size than the particle size of both of the active materials being in a powdered form, it is possible that some of one or both of them will move through the openings and "contaminate" the contact interface between the current collector and the other active material. The specific nature of the contaminating material is not necessarily important in terms of whether it is the one having the greater energy density, but the lesser rate capability, or the other. The point is that any contamination of the active material/current collector interface by the other active material is undesirable.

According to one embodiment of the present invention, when both of the first and the second active materials are in an un-cohesive state, they are of a size less than that of at least one opening of the current collector screen and capable of moving through the opening. An example of this is having both of the active materials in a powdered form. Then, one of the two active materials is rendered incapable of communication through the current collector. This is done by providing the one active material in a cohesive state, incapable of moving through the current collector opening. A cohesive state is defined as the active particles being held together firmly as part of the same mass, sticking together tightly, or having the particles of a body united throughout the mass. Examples of a cohesive state include providing the active material being in a pressed pellet or in a sheet form.

A method of providing an active material in a sheet form is described in U.S. Pat. Nos. 5,435,874 and 5,571,640, both to Takeuchi et al. and both assigned to the assignee of the present invention and incorporated herein by reference. These patents teach taking ground cathode active starting materials mixed with conductive diluents and a suitable binder material, and suspending the admixture in a solvent to form a paste. The admixture paste is fed into rollers to form briquettes or pellets, and then fed to rolling mills to produce the cathode active material in a sheet form. The sheet is finally dried and punched into blanks or plates of a desired shape.

According to the present invention, the one powdered cathode active material having particles of a size which can pass or move through the current collector openings is first loaded into a pressing fixture, followed by the current collector screen. The other cathode active material in a pellet or sheet form is then positioned on top of the current collector. The sandwich electrode is then formed by pressing this assembly from the direction of the other cathode active material pellet or sheet to the powdered active material. As the pressure is directed against the other cathode active material, the pellet or sheet first contacts the current collector which seals the opening off from the powdered cathode active material. Then, further pressing causes the current collector to move against the powdered material to complete the pressed electrode. This process greatly reduces, if not completely, eliminates contamination of the other cathode active material/current collector interface by the powdered active material.

While an active material in pellet or sheet form is preferred, it is also contemplated by the scope of the present invention that the other active material is comprised of particles that even in an un-cohesive state are incapable of moving through the at least one opening in the current collector screen. In that respect, the other active material is provided in a powder form of particles sized too large to move through the current collector opening. What ever its form, it is important that the pressing pressure is directed against the other active material first so that it seals off communication of the powdered active material through the current collector openings.

Electrode structures of the present invention include the following:

first electrode active material/current collector screen/second active material/current collector screen/first electrode active material, wherein the first and second electrode active materials are different, or first electrode active material/current collector screen/second electrode active material/second electrode active material/current collector screen/first electrode active material, wherein the first and second electrode active materials are different.

In both cases, one of the active materials is provided in a powder form capable of moving through the current collector openings, and the other is provided in the form of a sheet, pellet, or of particle sizes too large to penetrate the collect collector. Pressing is in the direction of the other active material to the powder material so that the current collector openings are sealed off by the other active material.

Another embodiment of the present invention has the following configuration:

first electrode active material/current collector screen/first electrode active material/second active material/first electrode active material/current collector screen/first electrode active material, wherein the first and second electrode active materials are different. In this case, the second electrode active material is the one in a powder form, and communication through the current collector is blocked by the first electrode active material.

In order to prevent internal short circuit conditions, the sandwich cathode is separated from the Group IA, IIA or IIIB anode by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.).

The electrochemical cell of the present invention further includes a nonaqueous, ionically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The inorganic, ionically conductive salt serves as the vehicle for migration of the anode ions to intercalate or react with the cathode active material. Preferably, the ion forming alkali metal salt is similar to the alkali metal comprising the anode.

In the case of an anode comprising lithium, the alkali metal salt of the electrolyte is a lithium based salt. Known lithium salts that are useful as a vehicle for transport of alkali metal ions from the anode to the cathode include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$ and $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl, formamide, dimethyl acetamide, γ-valerolactone, γ-butyrolactone (GBL), N-methyl-pyrrolidinone (NMP), and mixtures thereof. In the present primary cell, the preferred anode is lithium metal and the preferred electrolyte is 0.8M to 1.5M $LiAsF_6$ or $LiPF_6$ dissolved in a 50:50 mixture, by volume, of propylene carbonate as the preferred high permittivity solvent and 1,2-dimethoxyethane as the preferred low viscosity solvent.

A preferred electrolyte for a secondary cell according to the present invention comprises a solvent mixture of EC:DMC:EMC:DEC. Most preferred volume percent ranges for the various carbonate solvents include EC in the range of about 20% to about 50%; DMC in the range of about 12% to about 75%; EMC in the range of about 5% to about 45%; and DEC in the range of about 3% to about 45%. In a preferred form of the present invention, the electrolyte activating the cell is at equilibrium with respect to the ratio of DMC:EMC:DEC. This is important to maintain consistent and reliable cycling characteristics. It is known that due to the presence of low-potential (anode) materials in a charged cell, an un-equilibrated mixture of DMC:DEC in the presence of lithiated graphite ($LiC_6$~0.01 V vs $Li/Li^+$) results in a substantial amount of EMC being formed. When the concentrations of DMC, DEC and EMC change, the cycling characteristics and temperature rating of the cell change. Such unpredictability is unacceptable. This phenomenon is described in detail in U.S. patent application Ser. No. 09/669,936, filed Sept. 26, 2000, which is assigned to the assignee of the present invention and incorporated herein by reference. Electrolytes containing the quaternary carbonate mixture of the present invention exhibit freezing points below −50° C., and lithium ion secondary cells activated with such mixtures have very good cycling behavior at room temperature as well as very good discharge and charge/discharge cycling behavior at temperatures below −40° C.

The assembly of the cells described herein is preferably in the form of a wound element configuration. That is, the fabricated negative electrode, positive electrode and separator are wound together in a "jellyroll" type configuration or "wound element cell stack" such that the negative electrode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with the other cell components.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header is typically of a material similar to that of the case. The positive terminal pin supported in the glass-to-metal seal is, in turn, supported by the header, which is welded to the case containing the electrode stack. The cell is thereafter filled with the electrolyte solution described hereinabove and hermetically sealed such as by close-welding a stainless steel ball over the fill hole, but not limited thereto.

The above assembly describes a case-negative cell, which is the preferred construction of the exemplary secondary cell of the present invention. As is well known to those skilled in the art, the present secondary electrochemical systems can also be constructed in case-positive configuration.

The following examples describe the manner and process of manufacturing an electrochemical cell according to the present invention, and they set forth the best mode contemplated by the inventors of carrying out the invention, but they are not to be construed as limiting.

In the following examples, the first active electrode material is silver vanadium oxide (SVO) and the second electrode active material is $CF_x$. In particular, 94% SVO was combined with 3% PTFE, 2% graphite and 1% KETJENBLACK®, and 91% to 99% $CF_x$ was mixed with 0.5% to 4.0% PTFE, and 0 to 5% carbon conductive additive, by weight.

EXAMPLE 1

An electrode was made by placing an appropriate amount of $CF_x$ powder mixture in a pressing fixture, followed by placing a current collector screen on top of it. At this point, the screen was barely touching the $CF_x$ mixture, thus no $CF_x$ powder penetrated the openings of the screen. Then, a SVO sheet fabricated according to the previously discussed U.S. Pat. No. 5,545,497 to Takeuchi, with an appropriate thickness was placed on the top of the screen. Finally, the stacked electrode assembly was pressed under a designated pressure to yield an electrode having the configuration: SVO/current collector screen/$CF_x$. Since the pressure was applied from the top to the bottom of the stacked electrode assembly, the press exerted force against SVO sheet first, followed by the screen, followed by the $CF_x$ powder mixture. Adhering to this pressing order minimizes contamination of the SVO screen interface by $CF_x$ powder mixture because the SVO sheet is pressed against the current collector screen surface before the screen is in contact with the $CF_x$ powder. By combining two electrodes made in this manner, a final double current collector screen sandwich electrode is produced having the following configurations:

SVO/current collector screen/$CF_x$/current collector screen/SVO.

EXAMPLE 2

In this example, SVO was first pressed on both sides of a current collector screen. This was done in a manner similar to that described in Example 1, except the $CF_x$ powder was replaced by an SVO sheet or powder and the current collector was not necessarily a screen. The resulting subassembly of: SVO/current collector/SVO was then placed in the electrode fixture and $CF_x$ powder was placed on top of one of the SVO layers. Another SVO/current collector/SVO subassembly was then placed on the top of the $CF_x$ powder. Finally, the stacked electrode assembly was pressed under the designated pressure to yield an electrode of the following configuration:

SVO/current collector/SVO/$CF_x$/SVO/current collector/SVO.

As can be seen by those skilled in the art, current collectors can be designed in various ways to fit the criteria of a particular electrochemical cell design. To minimize the possibility of contamination of the SVO current collector screen interface by $CF_x$, small mesh sizes are required in Example 1. However, there is no special requirement in the design of the current collector in Example 2.

It is appreciated that various modifications to the inventive concepts described herein may be apparent to those of ordinary skill in the art without departing from the spirit and scope of the present invention as defined by the appended claims.

What is claimed is:

1. An electrochemical cell, comprising:
   a) an anode;
   b) a cathode characterized as having been formed by a process consisting essentially of:
      i) positioning a first electrode active material into a pressing fixture;
      ii) positioning a current collector screen on top of the first electrode active material, wherein the first electrode active material is in a powder form having at least some particles sized to be able to move through at least one opening in the current collector screen;
      iii) positioning a second electrode active material on top of the current collector screen, thereby forming an electrode assembly, wherein the second electrode active material is in a form incapable of moving through the at least one opening in the current collector screen; and
      iv) pressing the electrode assembly from the direction of the second electrode active material to the first electrode active material to form the cathode; and
   c) a separator electrically isolating the anode from the cathode; and
   d) an electrolyte activating the anode and the cathode.

2. The electrochemical cell of claim 1 wherein the second electrode active material is in a sheet or pellet form.

3. The electrochemical cell of claim 1 wherein with the second electrode active material in a powder form, it is capable of moving through the at least one opening in the current collector screen.

4. The electrochemical cell of claim 1 wherein the at least one opening is at least 0.004 inches in diameter.

5. The electrochemical cell of claim 1 wherein the first and the second electrode active materials are selected from the group consisting of $CF_x$, $C_2F$, $Ag_2O_2$, CuF, $Ag_2CrO_4$, $MnO_2$, silver vanadium oxide, copper silver vanadium oxide, $V_2O_5$, $LiCoO_2$, $LiNiO_2$, $LiMn_2O_4$, $CuO_2$, $TiS_2$, $Cu_2S$, FeS, $FeS_2$, copper oxide, copper vanadium oxide, and mixtures thereof.

6. The electrochemical cell of claim 1 wherein the anode is composed of lithium.

7. The electrochemical cell of claim 1 wherein the electrolyte includes a first solvent selected from the group consisting of tetrahydrofuran, methyl acetate, diglyme, trigylme, tetragylme, dimethyl carbonate, 1,2-dimethoxyethane, 1,2-diethoxyethane 1-ethoxy-2-methoxyethane, ethyl methyl carbonate, methyl propyl carbonate, ethyl propyl carbonate, diethyl carbonate, dipropyl carbonate, and mixtures thereof, and the second solvent is selected from the group consisting of propylene carbonate, ethylene carbonate, butylene carbonate, acetonitrile, dimethyl sulfoxide, dimethyl formamide, dimethyl acetamide, y-valerolactone, y-butyrolactone, N-methyl-pyrrolidinone, and mixtures thereof.

8. The electrochemical cell of claim 1 wherein the electrolyte includes a lithium salt selected from the group consisting of $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6F_5SO_3$, $LiO_2CCF_3$, $LiSO_6F$, $LiB(C_6H_5)_4$ $LiCF_3SO_3$, and mixtures thereof.

9. The electrochemical cell of claim 1 wherein the current collector screens is selected from the group consisting of stainless steel, titanium, tantalum, platinum, gold, aluminum, cobalt nickel alloys, highly alloyed ferritic stainless steel containing molybdenum and chromium, and nickel-, chromium-, and molybdenum-containing alloys.

10. The electrochemical cell of claim 1 wherein two of the pressed cathodes are positioned back to back to provide the cathode having the configuration: silver vanadium oxide/current collector screen/$CF_x$/current collector screen/silver vanadium oxide.

11. A positive electrode characterized as having been formed by a process consisting essentially of:
   a) positioning a first cathode active material into a pressing fixture;
   b) positioning a current collector screen on top of the first cathode active material, wherein the first cathode active material is in a powder form having at least some particles sized to be able to move through at least one opening in the current collector screen;

c) positioning a second cathode active material on top of the current collector screen, thereby forming a first cathode assembly, wherein the second cathode active material is in a form incapable of moving through the at least one opening in the current collector screen; and d) pressing the first cathode assembly from the direction of the second cathode active material to the first cathode active material to form the positive electrode.

12. The positive electrode of claim 11 having the configuration: silver vanadium oxide/current collector screen/silver vanadium oxide.

13. The positive electrode of claim 11 having the configuration: silver vanadium oxide/current collector screen/$CF_x$.

14. The positive electrode of claim 11 further comprising the steps of:

a) positioning a third cathode active material on top of one of the first and the second cathode active materials of the positive electrode in the pressing fixture, the third cathode active material being a different cathode active material than either of the first and the second cathode active materials;

b) positioning a second positive electrode comprising the first cathode active material and the second cathode active material contacted to opposed sides of a second current collector on top of the third cathode active material in the pressing fixture to form a second cathode assembly; and c) pressing the second cathode assembly to form the positive electrode.

15. The positive electrode of claim 14 having the configuration: silver vanadium oxide/current collector screen/silver vanadium oxide/$CF_x$/sliver vanadium oxide/current collector screen/silver vanadium oxide.

16. An electrochemical cell, comprising:

a) an anode electrode;

b) a cathode electrode characterized as having been formed by a process consisting essentially of:

i) positioning a first cathode comprising a first electrode active material and a second electrode active material contacted to opposed sides of a first current collector into a pressing fixture;

ii) positioning a third electrode active material on top of one of the first and the second electrode active materials of the first cathode in the pressing fixture, the third electrode active material being a different electrode active material than either of the first and the second electrode active materials;

iii) positioning a second cathode comprising the first electrode active material and the second electrode active material contacted to opposed sides of a second current collector positioned on top of the third electrode active material in the pressing fixture to form a cathode electrode assembly; and iv) pressing the cathode electrode assembly to form the cathode electrode;

c) an electrolyte activating the anode and the cathode electrodes; and d) a separator electrically isolating the anode electrode from the cathode electrode.

17. The electrochemical cell of claim 16 wherein the first and second electrode active materials are either the same or different.

18. The electrochemical cell of claim 16 wherein with the first and the second electrode active materials in a powder form, they are capable of moving through the at least one opening in the current collector screen.

19. The electrochemical cell of claim 16 wherein the third electrode active material is in a powder form having at least some particles sized to be able to move through at least one opening in the first and the second current collector screens.

20. The electrochemical cell of claim 16 wherein the third electrode active material is in a sheet or pellet form.

21. The electrochemical cell of claim 16 wherein the at least one opening of the current collector screen is at least 0.004 inches in diameter.

22. The electrochemical cell of claim 16 wherein the first, second, and third electrode active materials are selected from the group consisting of $CF_x$, $C_2F$, $Ag_2O$, $Ag_2O_2$, CuF, $Ag_2CrO_4$, $MnO_2$, silver vanadium oxide, copper silver vanadium oxide, $V_2O_5$, $LiCoO_2$, $LiNiO_2$, $Limn_2O_4$, $CuO_2$, $TiS_2$, $Cu_2S$, FeS, $FeS_2$, copper oxide, copper vanadium oxide, and mixtures thereof.

23. The electrochemical cell of claim 16 wherein the anode is lithium, both the first and second electrode active materials are SVO, and the third electrode active material is $CF_x$.

24. The electrochemical cell of claim 16 wherein the cathode has the configuration: silver vanadium oxide/current collector screen/silver vanadium oxide/$CF_x$/silver vanadium oxide/current collector screen/silver vanadium oxide.

* * * * *

UNITED STATES PATENT AND TRADEMARK OFFICE
CERTIFICATE OF CORRECTION

PATENT NO. : 6,727,022 B2
DATED : April 27, 2004
INVENTOR(S) : Hong Gan et al.

It is certified that error appears in the above-identified patent and that said Letters Patent is hereby corrected as shown below:

Column 10,
Line 44, "y-valerolactone, y-butyrolactone" should read -- γ-valerolactone, γ-butyrolactone ; and Column 12,
Line 5, "Limn$_2$O$_4$" should read -- LiMn$_2$O$_4$ --.

Signed and Sealed this

Thirtieth Day of November, 2004

JON W. DUDAS
*Director of the United States Patent and Trademark Office*